United States Patent
Bielefeld et al.

[11] Patent Number: 6,098,978
[45] Date of Patent: Aug. 8, 2000

[54] DEVICE FOR CHANGING THE MOVING DIRECTION OF A FLAT RECTANGULAR SHEETLIKE PRODUCT

[75] Inventors: Detlef Bielefeld; Ulrich Mylaeus, both of Munich; Bernhard Kistner, Pocking; Wilhelm Hell, Mering, all of Germany

[73] Assignee: Giesecke & Devrient GmbH, Germany

[21] Appl. No.: 09/043,922

[22] PCT Filed: Aug. 8, 1997

[86] PCT No.: PCT/EP97/04336

§ 371 Date: Jan. 13, 1999

§ 102(e) Date: Jan. 13, 1999

[87] PCT Pub. No.: WO98/06651

PCT Pub. Date: Feb. 19, 1998

[30] Foreign Application Priority Data

Aug. 9, 1996 [DE] Germany .................. 196 32 224

[51] Int. Cl.[7] ............................................. B65H 5/00
[52] U.S. Cl. ................. 271/225; 198/457.06; 198/464.2; 198/370.08; 271/265.01; 271/184; 271/198; 271/282
[58] Field of Search .............................. 271/225, 265.01, 271/184, 280, 282, 299, 300, 302, 310, 198; 198/457.06, 464.2, 370.08

[56] References Cited

U.S. PATENT DOCUMENTS

| | | |
|---|---|---|
| 3,703,951 | 11/1972 | Brockmuller . |
| 4,235,434 | 11/1980 | Müller ............................ 271/280 |
| 4,431,104 | 2/1984 | Orlowski et al. . |
| 5,074,544 | 12/1991 | Kulpa et al. . |
| 5,333,851 | 8/1994 | Kulpa . |
| 5,358,234 | 10/1994 | Boriani et al. ..................... 271/225 |
| 5,433,430 | 7/1995 | Straessler et al. .................. 271/225 |
| 5,655,643 | 8/1997 | Bonnet ........................... 178/370.08 |

FOREIGN PATENT DOCUMENTS

| | | |
|---|---|---|
| 0244650 A2 | 11/1987 | European Pat. Off. . |
| 044507 A2 | 9/1991 | European Pat. Off. . |
| 473166160A | 7/1991 | Japan ................................ 271/225 |
| 570325 | 12/1975 | Switzerland ....................... 271/184 |

OTHER PUBLICATIONS

Patent Abstract of Japan, Bond 7, Nt. 197, M–239 Abstract of JP 58–95064 A (Nippon Denki K.K.) Jun. 6, 1983.

*Primary Examiner*—H. Grant Skaggs
*Attorney, Agent, or Firm*—Bacon & Thomas PLLC

[57] ABSTRACT

A resistance device for use in an exercising apparatus having a plurality of resistance elements, a force transmission device and a resistance adjusting device. Through the force transmission device, a user can apply an exercise force to the resistance elements which in general provide a resisting force derived from atmospheric pressure. For adjusting the total resistance, the user may operate the resistance adjusting device to determine which resistance element(s) is(are) enabled to adjust the level of resisting force.

24 Claims, 8 Drawing Sheets

DEVICE FOR CHANGING THE MOVING DIRECTION OF A FLAT RECTANGULAR SHEETLIKE PRODUCT

BACKGROUND OF THE INVENTION

1. Field of the Invention

This invention relates to an apparatus for changing the direction of motion of flat, rectangular sheet material such as documents or bank notes.

2. Discussion of Related Art

Such apparatuses generally have a first transport path for transport of arriving the sheet material. In this first transport path the sheets are transported singly with a distance between every two sheets. Further, such apparatuses have a second transport path for further transport of the sheet material which is disposed at right angles to the first transport path. For drawing off a sheet from the first transport path to the second transport path a draw-off device is provided which draws off the sheet material without a change of position in a draw-off area.

Such apparatuses are known for example from DE-A-42 43 986, EP-A-0 622 316 and EP-A-0 505 340. In the draw-off devices described therein the sheet material is first grasped by a draw-off body and a corresponding mating roller and drawn off from the first transport path. The sheet material is then delivered to the second transport path.

A disadvantage of these apparatuses is that the draw-off bodies used are exposed to high wear due to the deceleration of the sheet material in the first transport path and the acceleration of the sheet material perpendicular to the transport direction of the first transport path, so that the draw-off bodies must frequently be replaced. Further, the delivery of the sheet material to the second transport path by the draw-off body constitutes a potential source of disturbance since jams can frequently occur in the intake to the second transport path in particular upon delivery of lower-quality sheet material.

SUMMARY OF THE INVENTION

The problem of the invention is to provide an apparatus for changing the direction of motion of flat, rectangular sheet material which works with high service life despite wear and delivers the sheet material reliably from one transport system to the other even at high transport speeds.

The essence of the invention is that the draw-off device draws off the sheet material directly by the transport medium of the second transport path. Since the length of the transport medium of the second transport path is generally much longer than the circumference of the draw-off body of known apparatuses, the wear arising from deceleration and acceleration of the sheet material is distributed much better. It is therefore necessary to replace the transport medium due to wear much less often than the draw-off bodies in known apparatuses. Further, the sheet material is firmly gripped directly by the transport medium of the second transport path and can be transported reliably without any other delivery point, so that the problems of delivery to the second transport path arising in known apparatuses do not arise.

In a preferred embodiment of the apparatus the transport media of the second transport path are each deflected about a draw-off wheel. The draw-off wheels are disposed on levers which are rotatable about a pivot. An actuator is used to move the levers from an inoperative position to a draw-off position.

In order to minimize the torques acting on the levers, the pivot is located in each case on the intersecting point of the median line between load strand and empty strand of the transport medium of the second transport path in the inoperative position and the median line between load strand and empty strand of the transport medium of the second transport path in the draw-off position.

Further, the first transport path can be divided into two partial paths into which the sheet material can be directed accordingly by a switch device. At least one draw-off device is located in each partial path. The drawn off sheet material is then transported further in corresponding partial paths of the second transport path. A suitable arrangement of the partial paths can e.g. increase the throughput of the apparatus. Alternatively, the sheet material can be turned about one or two axes.

DESCRIPTION OF THE DRAWINGS

Further advantages and developments of the invention can be found in the subclaims and the description of the embodiments with reference to the figures, in which:

DETAILED DESCRIPTION OF THE INVENTION

Figure 1:
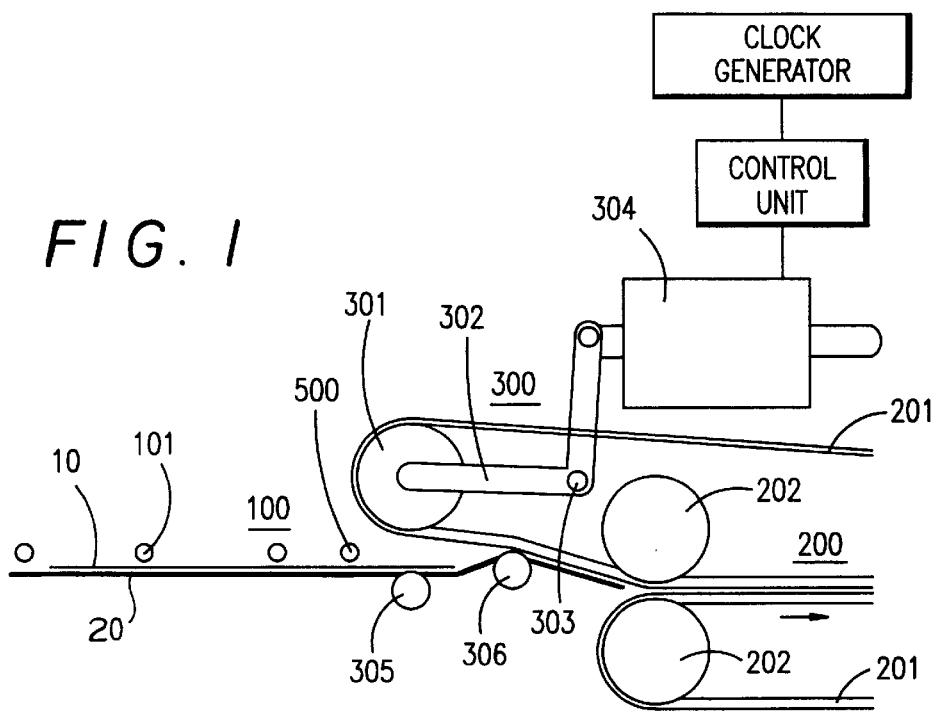
FIG. 1 shows a schematic diagram of a side view of the preferred embodiment.

FIG. 1 shows a schematic diagram of a side view according to a preferred embodiment of the invention. Sheet material 10 is transported in the draw-off area of first transport system 100 by means of transport medium 101 of the first transport system over guide plate 20. Sheet material 10 is transported by first transport system 100 in a direction perpendicular to the plane of the sheet of drawing.

After draw-off, sheet material 10 is transported by second transport system 200 in the direction of the arrow. Second transport system 200 is disposed perpendicular to first transport path 100. It consists of transport media 201 and transport wheels 202 for guiding and driving transport medium 201, respectively. The transport media preferably used are generally elastic belts.

In order to draw off sheet material 10 from first transport path 100 to second transport path 200 without a change of position in the draw-off area, draw-off device 300 is provided which has draw-off wheel 301 for deflecting transport medium 201 of the second transport path. Draw-off wheel 301 is disposed on lever 302 which is rotatable about pivot 303. Lever 302 can be moved by actuator 304 out of the inoperative position shown here to a draw-off position. In the draw-off position, sheet material 10 is grasped by transport medium 201 deflected about draw-off roller 301 and by mating roller 305. Additionally, transport medium 201 is supported by deflection roller 306.

Figure 2:
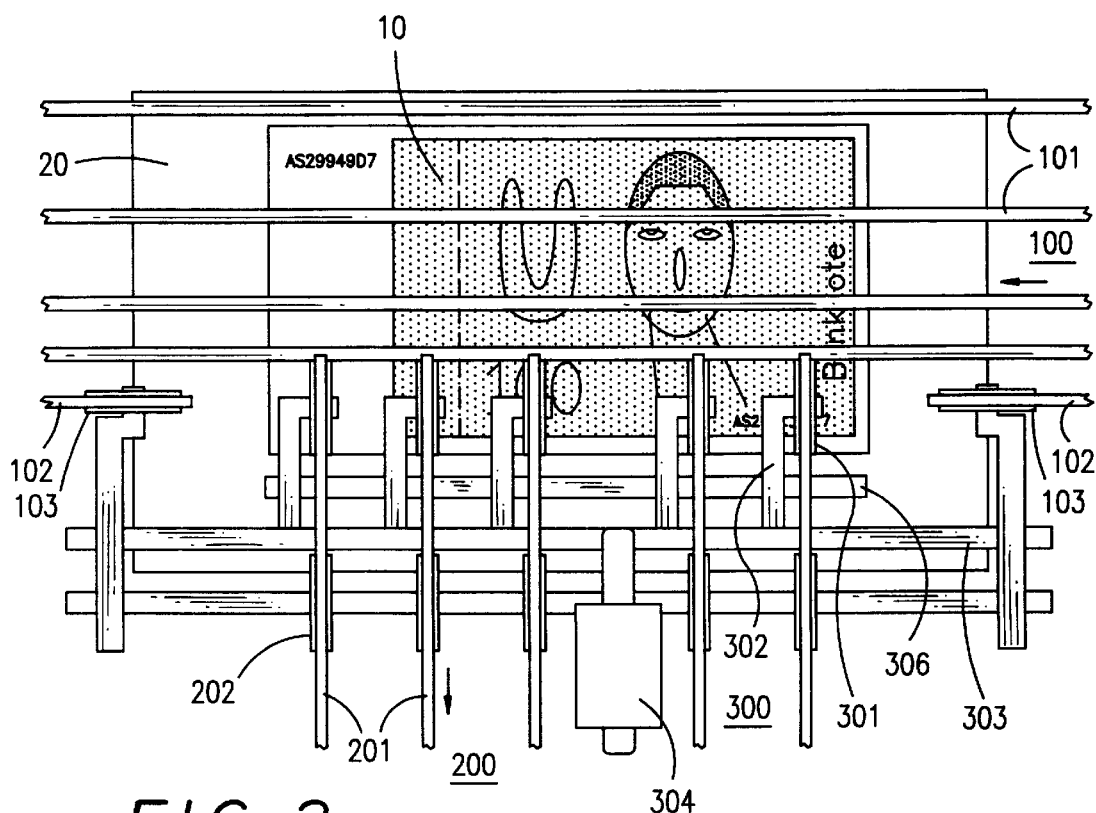
FIG. 2 shows a schematic diagram of a plan view of the preferred embodiment.

FIG. 2 shows a schematic diagram of a plan view of the preferred embodiment described above. The transport directions of first transport system 100 and second transport system 200 are marked by corresponding arrows. For sheet material 10 to be drawn off reliably, draw-off device 300 has for example five draw-off wheels 301 for deflecting one transport medium 201 of second transport path 200 in each case. Levers 302 are all pivoted about the same pivot 303 and moved simultaneously by actuator 304 out of an inoperative position to a draw-off position or vice versa.

To increase the possible contact surface of draw-off device 300 on bank note 10, transport media of first transport system 100 can be split or deflected in the draw-off area if required. For example, transport medium 102 of first transport path 100 is split here and accordingly deflected by deflection wheels 103.

Figure 3A:
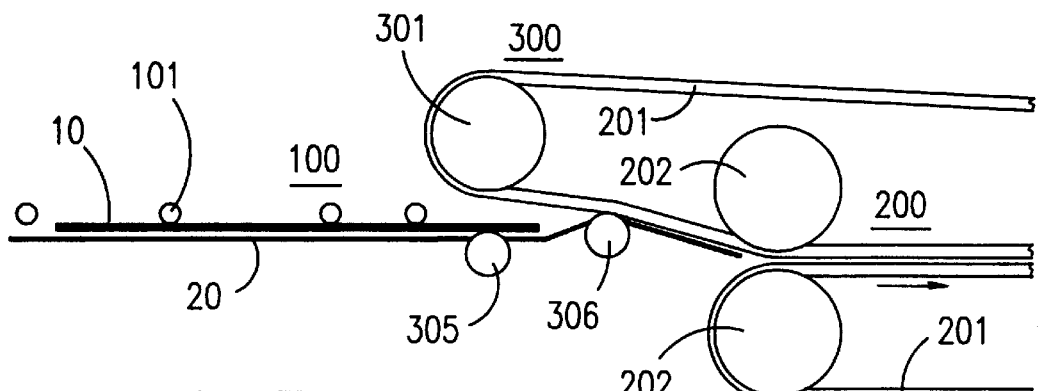
FIG. 3 shows a schematic diagram of the operational sequence of the preferred embodiment.

FIG. 3 shows a schematic diagram of the mode of operation of the preferred embodiment in a side view. In FIG. 3a sheet material 10 is transported by first transport path 100 to the draw-off area of draw-off device 300. At this time draw-off wheel 301 is in the inoperative position.

Figure 3B:
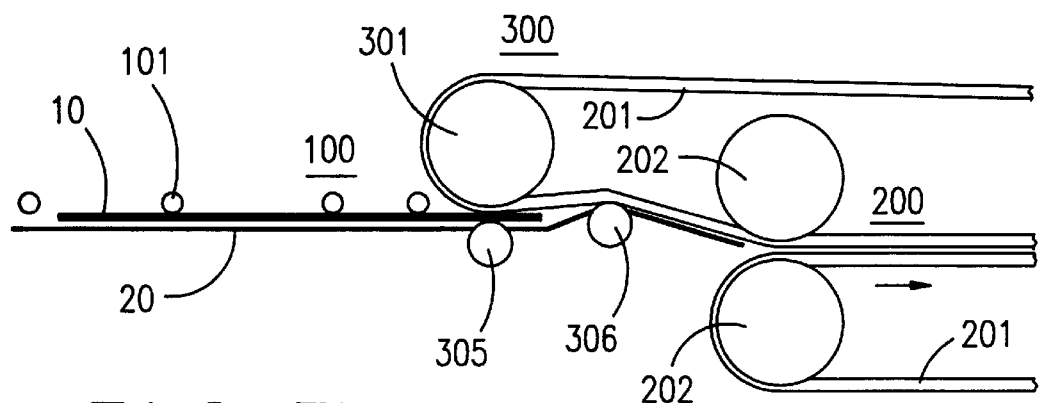

As shown in FIG. 3b, at a certain time to be determined in the way explained in the following, draw-off wheel 301 is moved to the draw-off position so that sheet material 10 is grasped by transport medium 201 of second transport path 200 and mating roller 305. When the sheet material is grasped it is decelerated and accelerated in the transport direction of second transport system 200. The wear arising on transport medium 201 from deceleration and acceleration of the bank note is distributed randomly over entire transport medium 201. Since the latter has for example a very great length in comparison with the circumference of draw-off wheel 301 and wear is distributed uniformly over transport medium 201, it can be used for a relatively long time without maintenance.

Figure 3C:
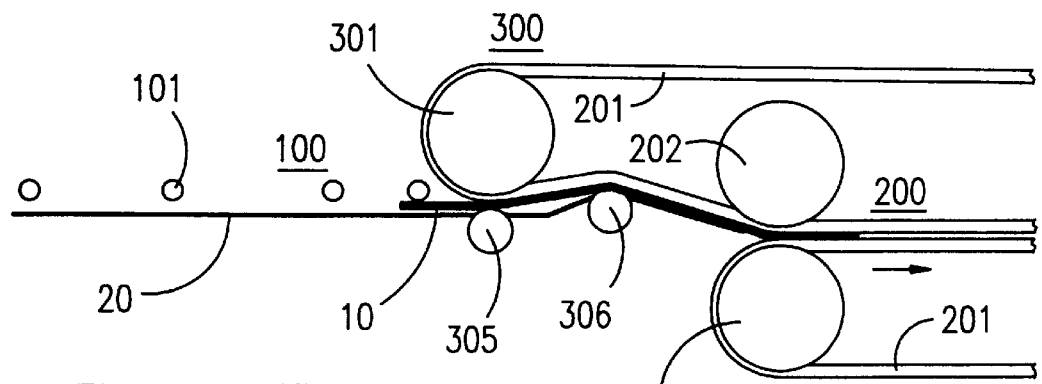

FIG. 3c shows how sheet material 10 is transported in transport medium 201. Sheet material 10 is transported by transport medium 201 at least on one side so that sheet material 10 can neither buckle nor tear. In the area of second transport system 200 where sheet material 10 is transported merely by transport medium 201, disturbances in transport are prevented by mating roller 305, deflection roller 306 or guide plate 20.

Figure 4:
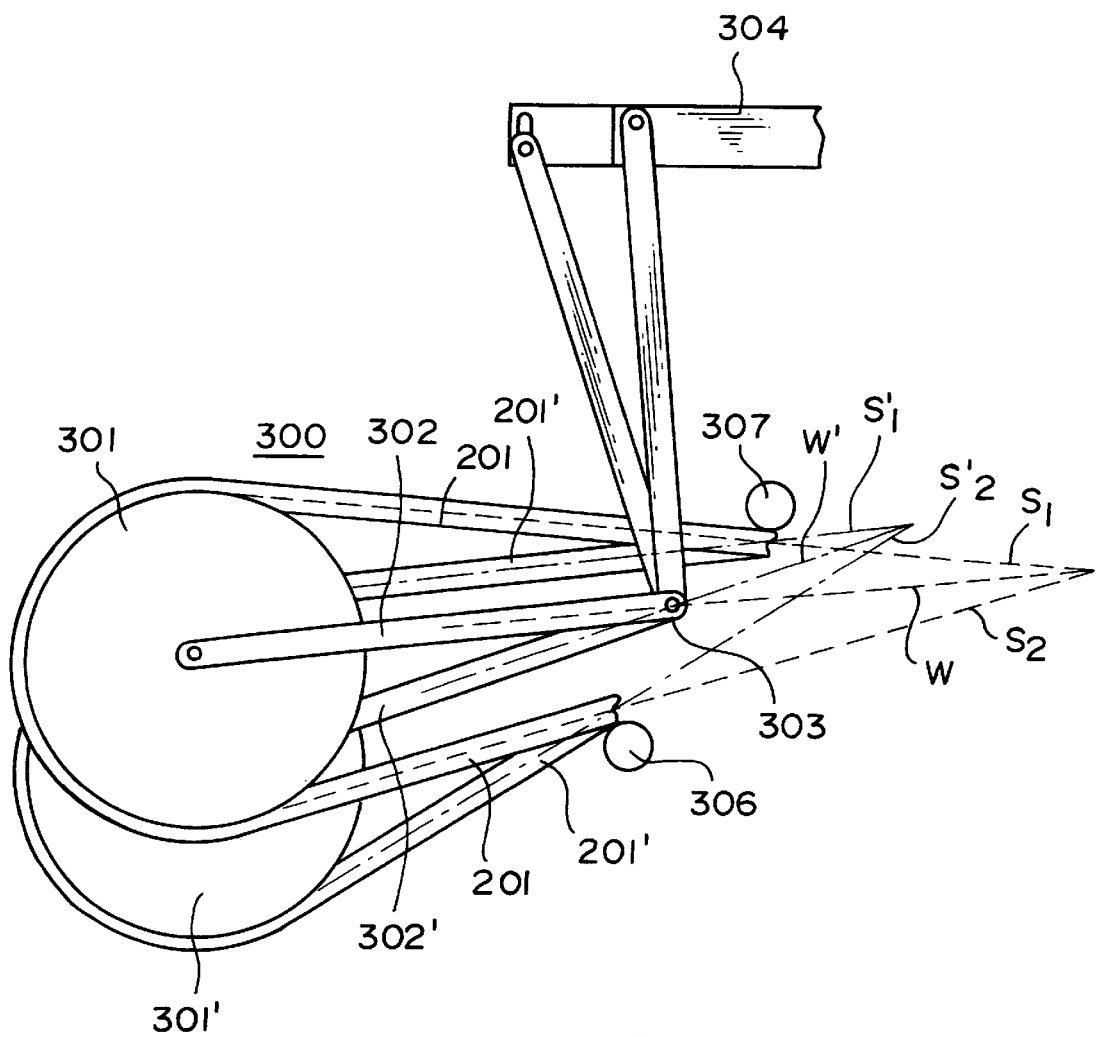
FIG. 4 shows a schematic diagram for determining the pivot.

FIG. 4 shows how pivot 303 of lever 302 is selected so as to minimize the forces arising during motion of draw-off wheel 301 from the inoperative position to the draw-off position. Since elastic belts are preferably used as transport medium 201, the occurring forces result substantially from the tensile stress in transport medium 201. In order to ensure a draw-off of about 10 sheets per second, relatively high tension must be exerted on transport medium 201 in order for example to prevent vibrations of transport medium 201 when passing from the inoperative position to the draw-off position. If pivot 303 is selected unfavorably, the forces arising from the tension of transport medium 201 will cause a great torque on lever 302 which must in turn be compensated by actuator 304. This means that actuator 304 must be accordingly big.

For determining optimum pivot 303 one first determines median line W of the angle between legs $S_1$ and $S_2$ in the inoperative position. Legs $S_1$ and $S_2$ are fixed by the empty strand denoting the second transport system 200 in a position where no sheets are drawn off from the first transport device, and load strand denoting the second transport system 200 in a position where sheets are drawn off from the first transport device, of transport medium 201. The empty strand is formed by the part of transport medium 201 between the contact point of draw-off roller 301 and the contact point with deflection roller 307. The load strand is the part of transport medium 201 between the contact point of draw-off roller 301 and the contact point of deflection roller 306. In a second step one determines median line W' of the angle between legs $S_1'$ and $S_2'$. Legs $S_1'$ and $S_2'$ are defined analogously by the empty strand and load strand of transport medium 201' in the draw-off position.

One now fixes optimum pivot 303 by the intersecting point of median lines W and W'. This selection of pivot 303 ensures that the forces arising from the tension in the load strand and empty strand of transport medium 201 are compensated so that no torque acts on lever 302 either in the draw-off position or in the inoperative position. The advantage of this embodiment is that the motion of draw-off wheel 301 from the inoperative position to the draw-off position can be achieved with low application of force by actuator 304 so that actuator 304 can be of accordingly small dimensions. One can further obtain short switching times of actuator 304 between the inoperative position and the draw-off position of draw-off wheel 301.

For moving draw-off wheel 301 from the inoperative position to the draw-off position, actuator 304 preferably has an electrically drivable lifting magnet. In addition, the apparatus has a control unit not shown in the figures for controlling the draw-off time of draw-off device 300. Some possibilities will be stated by way of example in the following.

If the apparatus has a clock generator emitting a signal at regular time intervals, the control unit can move draw-off wheel 301 from the inoperative position to the draw-off position in accordance with the timing of this clock generator after an arbitrary but firmly selected number of clock pulses and hold it there for a certain number of pulses. However, this procedure presupposes that bank notes 10 are also transported into the draw-off area of draw-off device 300 with regular clocking and that actuator 304 is adapted to be driven electrically.

If the sheets pass into the draw-off area of draw-off device 300 at irregular time intervals, a position sensor 500 can be provided in first transport path 100 for detecting the leading and/or trailing edges of sheet material 10 and transmitting a signal indicating the presence or absence of sheet material 10 to the control unit. In accordance with the signal from the position sensor 500 the control unit can select the draw-off time. Here, too, it is necessary that actuator 304 be adapted to be driven electrically.

If one wants to avoid controlling the draw-off time electrically, one can control the draw-off time by a mechanical coupler rod system for example. Such a coupler rod system can be operated for example via a crank rod in the drive of the first transport path. This is in particular possible if small forces are necessary for moving transverse draw-off wheel 301 from the inoperative position to the draw-off position, as described above.

Figure 5A:
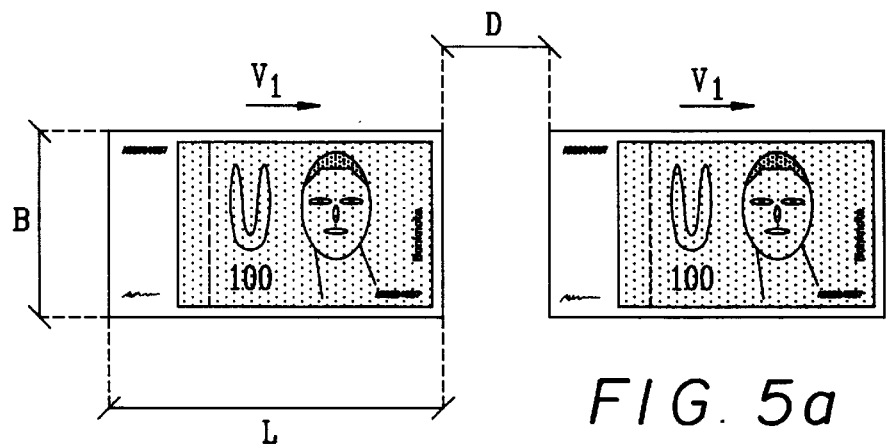
FIG. 5 shows a schematic diagram of a first draw-off geometry.
Figure 5B:
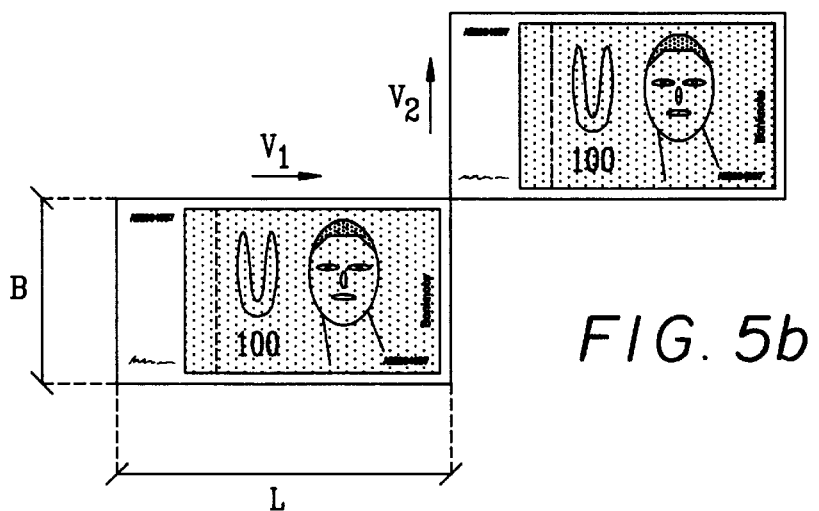

In order to avoid disturbances during the draw-off of sheet material 10 it is necessary for the first sheet to be drawn off before the following sheet passes into the draw-off area. The corresponding draw-off geometry is shown schematically in FIG. 5. FIG. 5a shows how two sheets with distance D between the individual sheets are transported in the first transport path at transport speed $V_1$. The rectangular sheet material is characterized by its length L and its width B. In order to avoid overlaps of the two sheets during draw-off of the first sheet, the sheet drawn off at speed $V_2$ must have left the draw-off area before the following sheet is transported by first transport path 100 into the draw-off area, as shown in FIG. 5b.

If all sheets have equal length L and width B and equal distance D between two sheets, one can derive relations for transport speed $V_1$ of first transport path 100 and transport speed $V_2$ of second transport path 200 at given desired throughput N of the apparatus. At given throughput N the relation holding for transport speed $V_1$ of first transport path 100 is $V_1=N*(L+D)$. To prevent overlaps of the two sheets during draw-off, transport speed $V_2$ of second transport path 200 must be selected higher than or equal to the product of transport speed $V_1$ of first transport path 100 and width B of the following sheet divided by distance D between these sheets. The corresponding equation is $V_2=V_1*B/D$.

Figure 6:
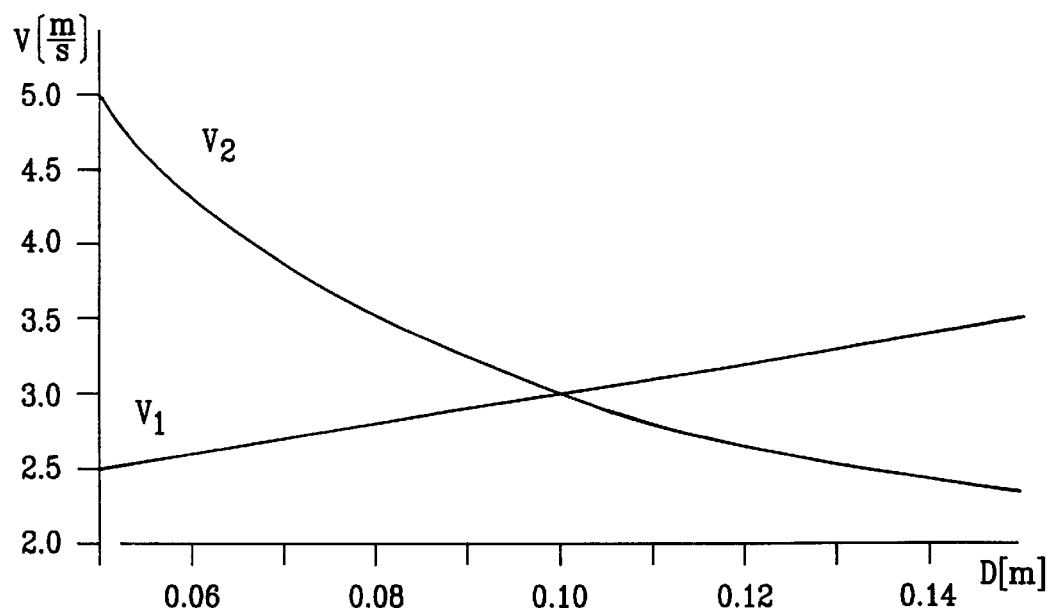
FIG. 6 shows a diagram of the transport speeds in the first and second transport paths.

In FIG. 6 transport speeds $V_1$ and $V_2$ are plotted as a function of distance D between the sheets. As explained above, transport speed $V_1$ increases linearly with distance D. To avoid overlaps, transport speed $V_2$ must be greater than or equal to curve $V_2$, i.e. transport speed $V_2$ must be within the area marked in gray.

As a numerical example, N=10 1/s, L=0.2 m and B=0.1 m were selected. As one can see in FIG. 6, speeds $V_1$ and $V_2$ can be selected equal for distance D=0.1 m. For smaller distances D speed $V_2$ is always greater than speed $V_1$. At smaller distance D speed $V_2$ can also be selected smaller than speed $V_1$.

Figure 7:
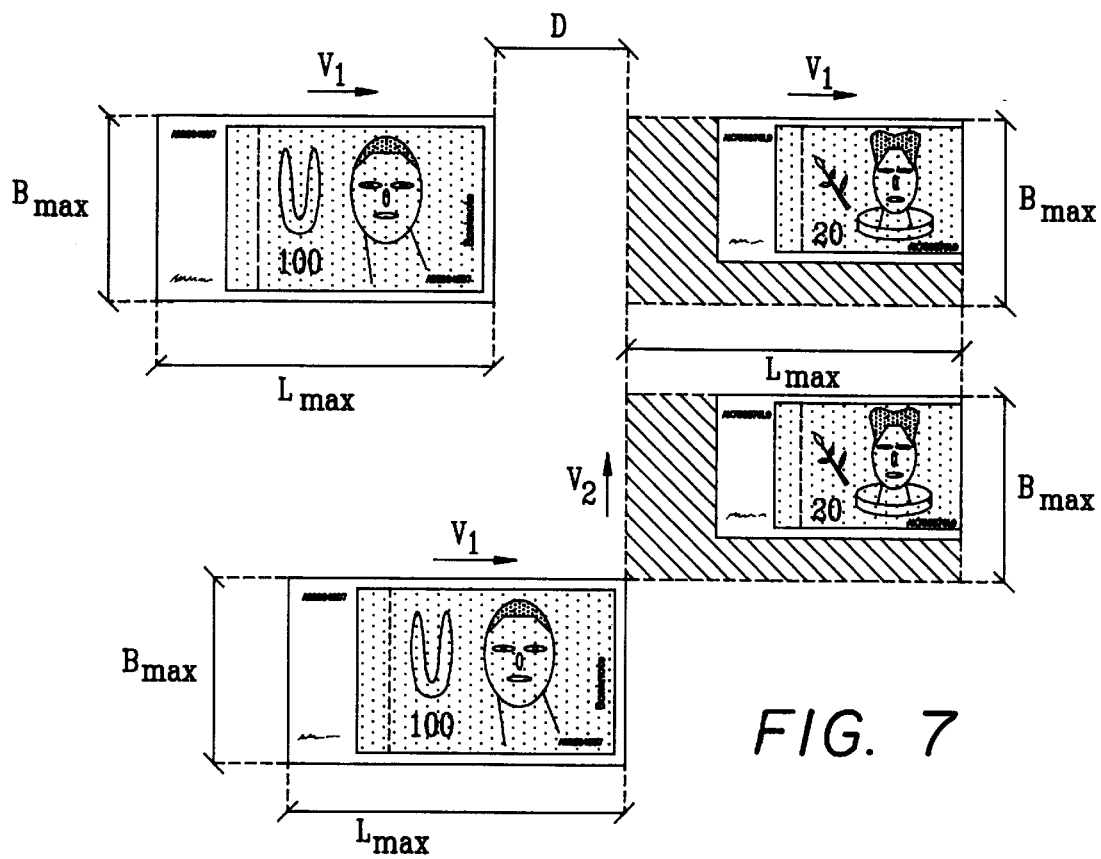
FIG. 7 shows a schematic diagram of a second draw-off geometry.

In case not all sheets have equal length L and width B one can, as shown in FIG. 7, provide an area (shown hatched) of length $L_{max}$ and width $B_{max}$ for each sheet 10 in accordance with maximum length $L_{max}$ of the longest sheet to be drawn off and maximum width $B_{max}$ of the widest sheet to be drawn off. Between the areas distance D is provided analogously to FIG. 5. Within the hatched areas individual sheets 10 can be disposed fundamentally in arbitrary fashion. The right upper comer of each sheet is preferably disposed in the right upper corner of the particular area.

The abovementioned relations for transport speed $V_1$ of first transport path 100 and transport speed $V_2$ of second transport path 200 apply analogously here. Length L corresponds to length $L_{max}$ and width B corresponds to width $B_{max}$.

Figure 8:
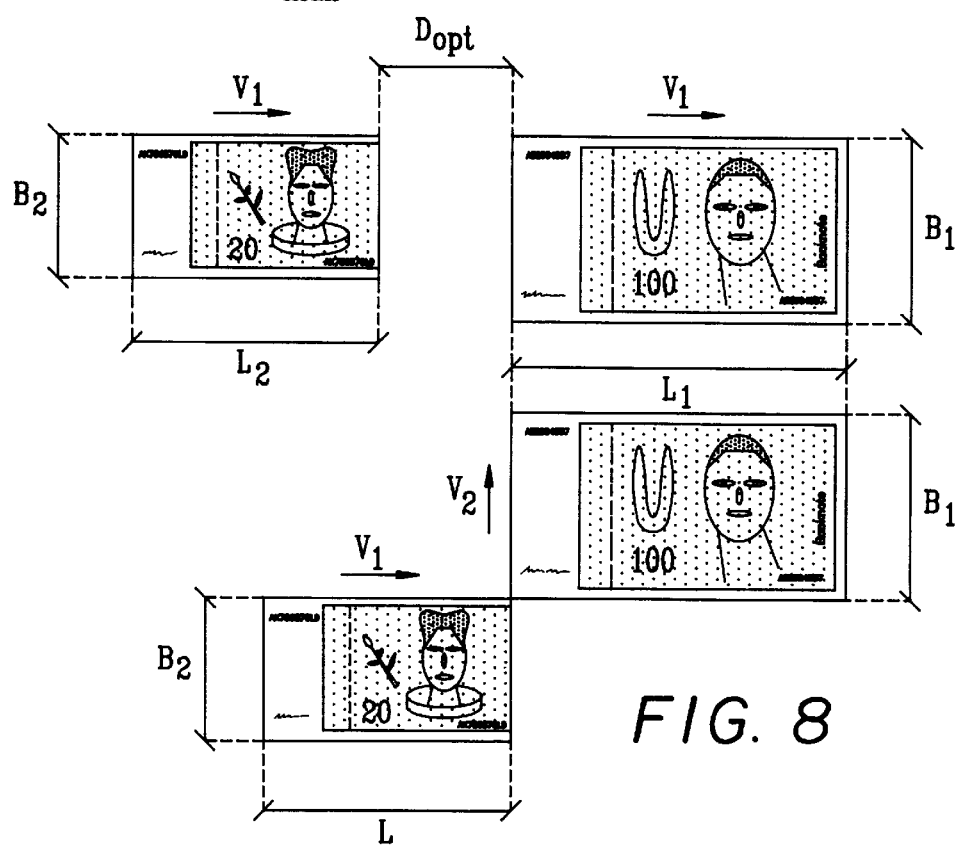
FIG. 8 shows a schematic diagram of a third draw-off geometry.

A further possibility for drawing off sheets of different sizes is shown in FIG. 8 and consists in optimizing throughput N of the apparatus, which states the number of sheets drawn off per second, by adapting distance D between two sheets at given transport speed $V_1$ of first transport path 100 and transport speed $V_2$ of second transport path 200. For this purpose width $B_1$ of sheet material 10 is detected for example during singling of the sheet material, and optimum distance $D_{opt}$ determined from transport speeds $V_1$ and $V_2$ and detected width $B_1$. The corresponding equation is $D_{opt}=B_1*V_1/V_2$. The sheet material following the detected sheet material is singled in such a way that optimum distance $D_{opt}$ is maintained between the two sheets. Throughput N of the apparatus is thus not constant but depends on the various lengths and widths of the individual sheets.

Should optimum distance $D_{opt}$ be smaller by reason of the parameters than minimum distance $D_{min}$ necessary for smooth operation of the apparatus, optimum distance $D_{opt}$ can be replaced by minimum distance $D_{min}$. Minimum distance $D_{min}$ can be determined for example by switches in the transport system which require a certain distance between two sheets in accordance with the transport speed in the transport system for reliable attack of a switch between these sheets.

Figure 9:
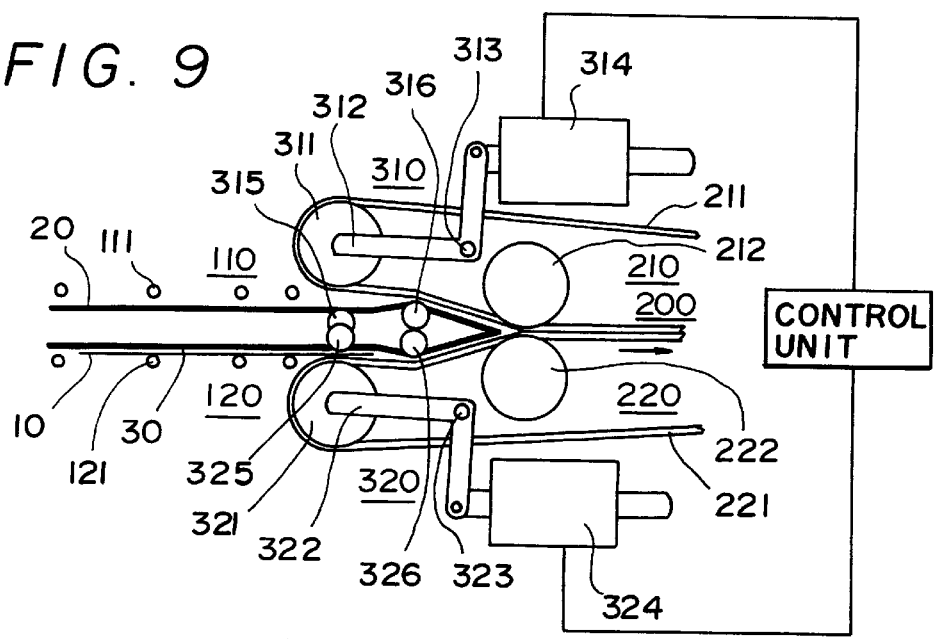
FIG. 9 shows a schematic diagram of a side view of a double draw-off apparatus.

FIG. 9 shows a schematic diagram of a side view of a double draw-off apparatus wherein the first transport path has a switch for guiding the sheet material either into upper first partial path 110 or into lower first partial path 120. Partial paths 110 and 120 are constructed analogously to first transport system 100. They each have transport media 111, 121 transporting sheet material 10 over guide plate 20, 30. Further, draw-off devices 310, 320 are provided in each case for drawing off the sheet material from upper and lower draw-off areas. Draw-off devices 310, 320 are constructed analogously to draw-off device 300 of FIG. 1. They each have draw-off wheel 311, 321 mounted on lever 312, 322 rotatable about pivot 313, 323. Levers 312, 322 are each moved by actuators 314, 324 from an inoperative position to a draw-off position. In addition, draw-off devices 310, 320 have corresponding mating rollers 315, 325 and deflection rollers 316, 326. Second transport path 200 is also divided into two partial paths 210, 220. Partial paths 210, 220 each have transport medium 211, 221 and transport wheels 212, 222.

Figure 10:
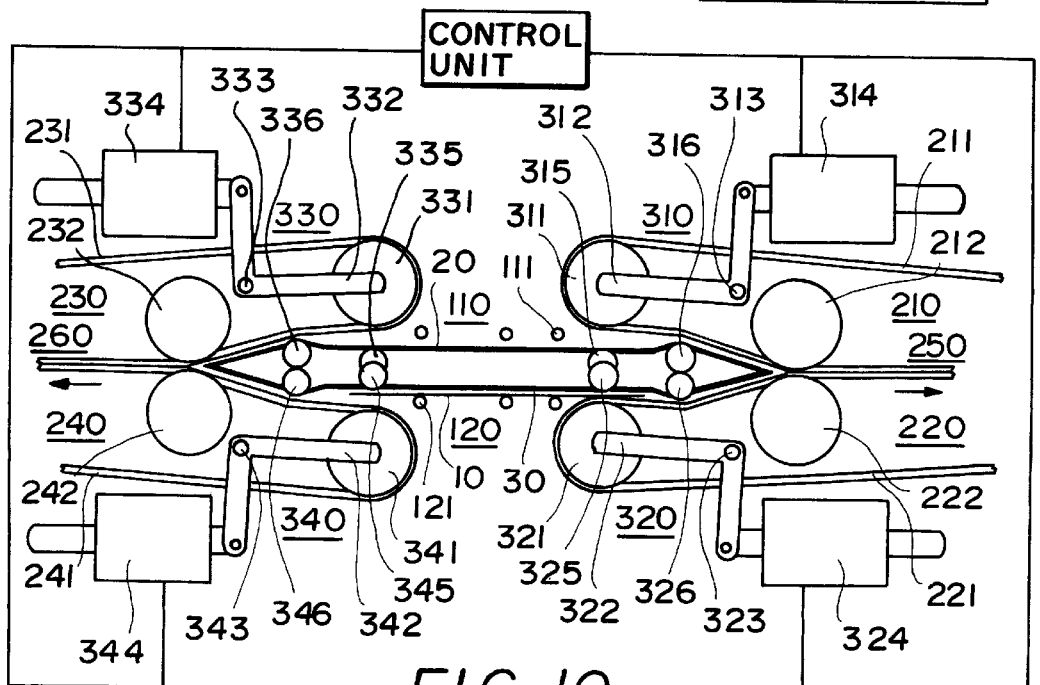
FIG. 10 shows a schematic diagram of a side view of a quadruple draw-off apparatus.

FIG. 10 shows a quadruple draw-off apparatus wherein partial paths 110, 120 of first transport path 100 each have two draw-off devices 310, 330; 320, 340. The individual components are designated analogously to FIG. 9. However, second transport path 200 has four partial paths 210, 220, 230, 240 here. Partial paths 210 and 220 are first combined in intermediate path 250. Partial paths 230 and 240 are analogously combined in intermediate path 260. Intermediate paths 250 and 260 are then in turn combined in second transport path 200.

Via the double draw-off apparatus shown in FIG. 9 and the quadruple draw-off apparatus shown in FIG. 10 one can ensure different functional effects depending on the particular guidance of sheet material 10 through the individual partial paths.

Figure 11A:
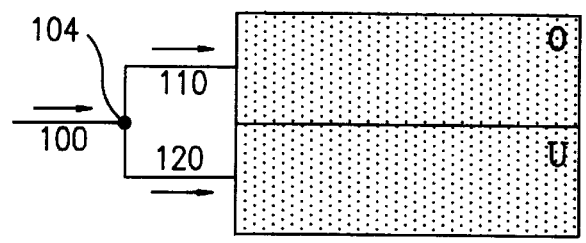
FIG. 11 shows a schematic diagram of possible partial paths of the first transport path.

FIG. 11 shows two possibilities of guidance for first partial paths 110 and 120. In FIG. 11a the sheet material arriving via first transport path 100 can be directed by a switch device 104 onto one of partial paths 110, 120. These partial paths then open either into upper draw-off area O shown in gray here or into lower draw-off area U. The sheet material is transported in the same direction by upper and lower partial paths 110, 120 both in the upper and lower draw-off areas.

Figure 11B:
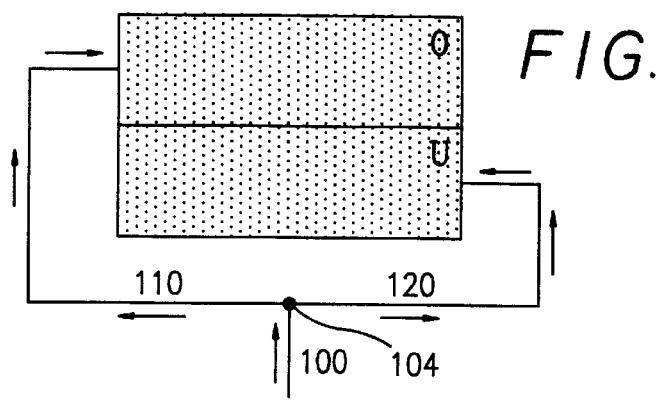

In FIG. 11b the sheet material is transported in opposite directions by first partial paths 110, 120 in the upper and lower draw-off areas. This causes the sheet material to pass into the draw-off area of a draw-off device either in the original position or in a position turned about the lateral axis.

Figure 12A:
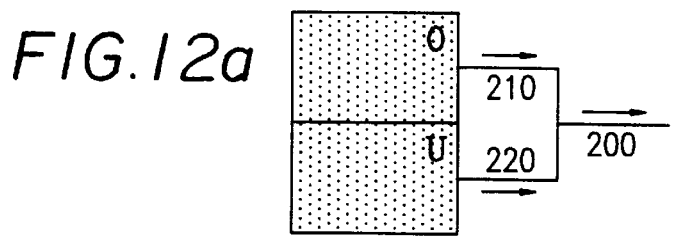
FIG. 12 shows a schematic diagram of possible partial paths of the second transport path.

FIG. 12 shows different possibilities for partial paths 210 to 260 of second transport path 200. FIG. 12a shows the guidance of partial paths 210, 220 in case a draw-off device is provided in upper draw-off area O and in lower draw-off area U in each case according to FIG. 9. The sheet material drawn off from the draw-off areas is transported into second transport path 200 without a change of position here.

Figure 12B:
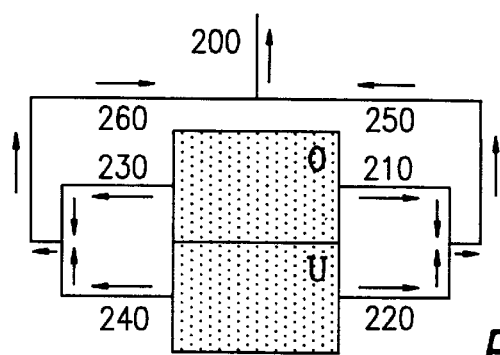

FIG. 12b shows a possible guidance of partial paths 210 to 260 in case two draw-off devices are provided in upper draw-off area O and in lower draw-off area U in each case according to FIG. 10. As shown here, the sheet material drawn off to the right from the upper or lower draw-off area is transported via partial paths 210 and 220 into intermediate path 250. The sheet material drawn off to the left is transported via partial paths 230 and 240 into intermediate path 260. Intermediate paths 250 and 260 then transport the sheet material to second transport path 200. This arrangement of partial paths 210 to 260 makes it possible for example to turn the sheet material drawn off to the left about the longitudinal axis of the sheet material vis-a-vis the sheet material drawn off to the right before it passes into transport path 200.

By suitable combinations of the partial paths one can ensure different functional effects of the apparatus. To increase throughput it is possible for example to dispose first partial paths 10, 120 according to FIG. 11a and second partial paths 210, 220 according to FIG. 12a. If the sheets arriving by first transport system 100 are now transported alternatingly into partial paths 110 and 120, it is possible to substantially increase the transport speed of first transport path 100 since only every second sheet must be drawn off by the particular draw-off device. Distance D in the particular draw-off area is in this case always greater than length L of the sheet material.

If one combines the partial paths according to FIGS. 11b and 12a, sheets which arrive with the upper side upward can be drawn off for example in upper draw-off area O, while sheets with the lower side upward are drawn off in lower draw-off area U and thus turned vis-a-vis the sheet material drawn off from upper draw-off area O. The sheet material transported in second transport path 200 is thus always oriented with the upper side upward.

If one combines the partial paths according to FIGS. 11b and 12b, one obtains a sorting apparatus which can additionally turn the sheet material about the longitudinal axis of sheet material 10. This arrangement makes it possible to feed randomly oriented sheet material by means of first transport path 100 and change its position by suitable turning within the sorting apparatus so that the sheet material is always transported in transport path 200 with the upper side upward and the leading edge leading.

Figure 13:
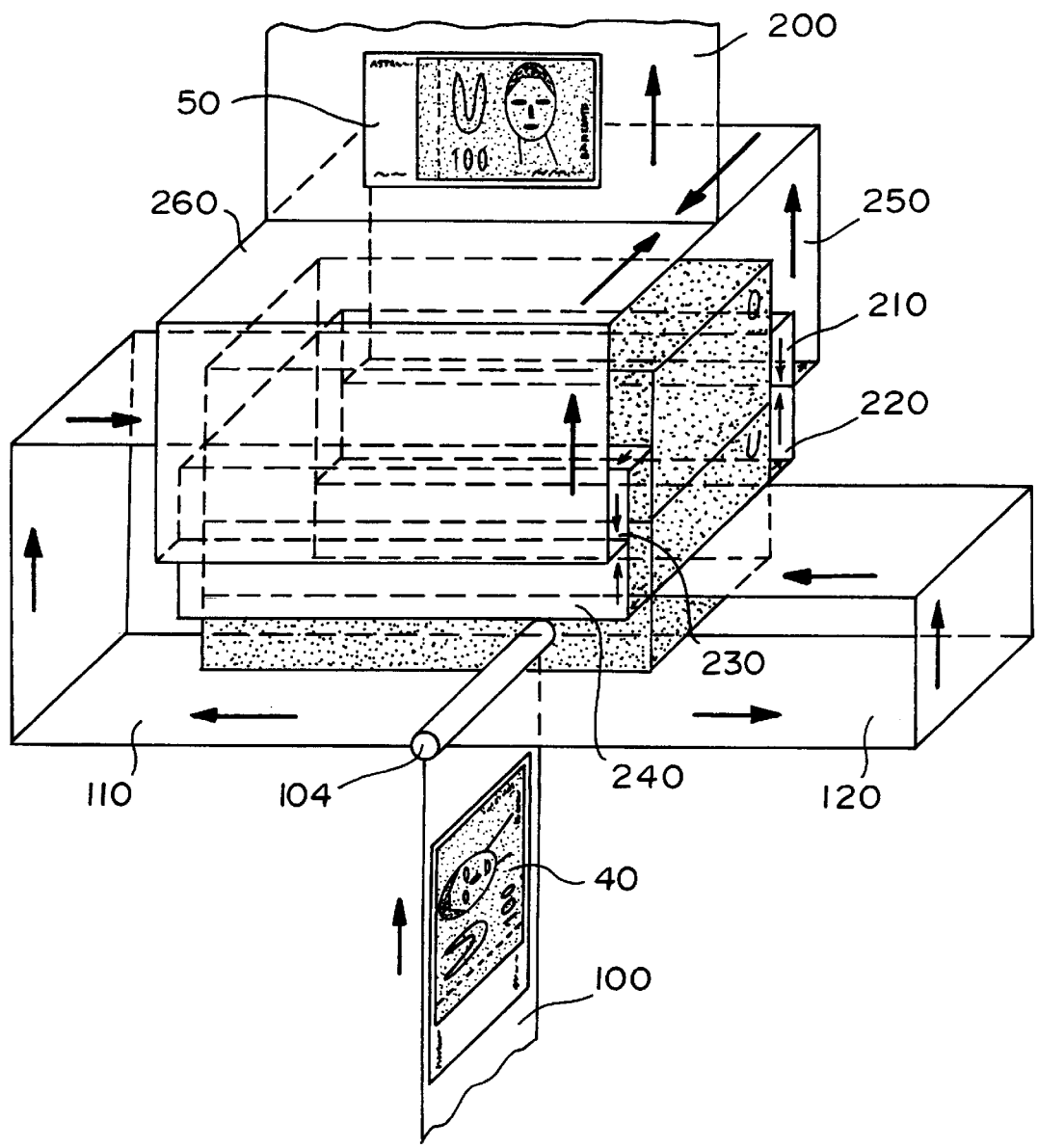
FIG. 13 shows a schematic diagram of a position sorting apparatus.

Such a sorting apparatus is shown schematically in FIG. 13. In order to avoid overlaps in transport path 100, 200, partial paths 110, 120, 210, 220, 230, 240 and intermediate paths 250, 260 are preferably designed with equal length. This ensures that the distance between two sheets in transport path 200 is equal regardless of which partial paths the sheet material was transported over.

The draw-off times of particular draw-off devices 310, 320, 330, 340 are controlled and suitably coordinated by a control unit. For the sorting apparatus shown in FIG. 13 the position of sheet material 40 in first transport path 100 can be detected by means of suitable sensors for example. The control unit then evaluates this information accordingly and coordinates switch 104 or the draw-off times of the individual draw-off devices in such a way that sheet material 50 leaves the sorting apparatus in a defined position.

The draw-off devices shown in FIGS. 9 and 10 are preferably used in upper draw-off areas O and lower draw-off areas U. The apparatuses described above can fundamentally also be executed with other draw-off devices, such as draw-off devices according to the documents cited at the outset, to increase throughput or to sort the position of the sheet material.

What is claimed is:

1. An apparatus for changing the direction of motion of flat, rectangular sheet material such as documents or banknotes, comprising:

a first transport path (100) that transports the sheet material (10) with a distance (D) between every two individual sheets along a linear path;

a second transport path (200) including a transport device (201) that further transports the sheet material (10) from the first transport path (100) at right angles from the first transport path;

a draw-off area where the sheet material (10) changes directions from the first transport path (100) to the second transport path (200); and at least one draw-off device (300) arranged to draw off individual sheets of the sheet material (10) from the first transport path (100) directly to the second transport path (200) without a change of position in the draw-off area, and so that the sheet material (10) is drawn off directly by the transport device (201) of the second transport path (200).

2. The apparatus as recited in claim 1, wherein the transport device (201) comprises an elastic belt.

3. The apparatus as recited in claim 1, wherein the draw-off device (300) has at least one transverse draw-off wheel (301) about which the transport device (201) of the second transport path (200) is deflected.

4. The apparatus as recited in claim 1, wherein the draw-off device (300) has at least one transverse draw-off wheel (301) about which the transport device (201) of the second transport path (200) is deflected and the transverse draw-off wheels (301) are disposed on at least one lever (302) rotatable about a pivot (303).

5. The apparatus as recited in claim 1, wherein the draw-off device (300) has at least one transverse draw-off wheel (301) about which the transport device (201) of the second transport path (200) is deflected, the transverse draw-off wheels (301) are disposed on at least one lever (302) rotatable about a pivot (303) and the levers (302) are moved from an inoperative position to a draw-off position by at least one actuator (304).

6. The apparatus as recited in claim 1, wherein the draw-off device (300) has at least one transverse draw-off wheel (301) about which the transport device (201) of the second transport path (200) is deflected, the transverse draw-off wheels (301) are disposed on at least one lever (302) rotatable about a pivot (303), the levers (302) are moved from an inoperative position to a draw-off position by at least one actuator (304) and the at least one actuator (304) has a lifting magnet.

7. The apparatus as recited in claim 1, wherein a control unit is provided for controlling the draw-off time of the draw-off device (300).

8. Apparatus as recited in claim 1, wherein a control unit is provided for controlling the draw-off time of the draw-off device (300) and including a clock generator; said control unit arranged to select the draw-off time in accordance with the timing of the clock generator.

9. The apparatus as recited in claim 1, wherein a control unit is provided for controlling the draw-off time of the draw-off device (300); a position sensor for the leading edges and/or trailing edges of the sheet material (10) is provided in the first transport path (100); and the control unit is arranged to select the draw-off time in accordance with the signal from the position sensor.

10. The apparatus as recited in claim 1, wherein the first transport path (100) and the second transport path (200) are driven by at least one drive, the transport speed ($V_2$) of the second transport path (200) being greater than or equal to the product of the transport speed ($V_1$) of the first transport path (100) and the width (B) of a sheet divided by the distance (D) between two sheets.

11. The apparatus as recited in claim 1, wherein the first transport path (100) is driven at a transport speed ($V_1$) and the second transport path (200) at a transport speed ($V_2$) by at least one drive, the distance ($D_{opt}$) between two sheets being greater than or equal to the product of the width ($B_1$) of the first sheet of the two sheets and the transport speed ($V_1$) of the first transport path (100) divided by the transport speed ($V_2$) of the second transport path (200).

12. The apparatus as recited in claim 1, wherein the draw-off device (300) has at least one transverse draw-off wheel (301) about which the transport device (201) of the second transport path (200) is deflected;

the at least one transverse draw-off wheel (301) is positioned on at least one lever (302) that is rotatable about a pivot (303); and the at least one lever (302) is moved from an inoperative position to a draw-off position by at least one actuator (304); and the pivot (303) of the lever (302) is located on an imaginary median line (W) between when the second transport path (200) is not deflected to the draw-off position and when the second transport path (200) is in a position where the sheet material is drawn off the first transport device (201).

13. The apparatus as recited in claim 1, wherein the draw-off device (300) has at least one transverse draw-off wheel (301) about which the transport device (201) of the second transport path (200) is deflected;

the transverse draw-off wheel (301) is disposed on at least one lever (302) rotatable about a pivot (303);

the at least one lever (302) is moved from an inoperative position to a draw-off position by at least one actuator (304); and the pivot (303) of the lever (302) is located on an imaginary median line (W) between when the second transport path (200) is not deflected to the draw-off position and when the second transport path (200) is in a position where the sheet material is drawn off the first transport device (201).

14. An apparatus for changing the direction of motion of flat, rectangular sheet material such as documents or banknotes, comprising:

a first transport path (100) that transports the sheet material (10) with a distance (D) between every two individual sheets along a linear path;

a second transport path (200) including a transport device (201) that further transports the sheet material (10) from the first transport path (100) at right angles from the first transport path;

a draw-off area where the sheet material (10) changes directions from the first transport path (100) to the second transport path (200); and at least one draw-off device (310, 320, 330, 340) arranged to draw off individual sheets of the sheet material (10) from the first transport path (100) to the second transport path (200) without a change of position in the draw-off area; and the first transport path (100) further includes an upper or a lower first partial path (110, 120) and a switch (104) configured for guiding the sheet material (10) into either the upper or the lower first partial path (110, 120) which transports the sheet material (10) into the draw-off area toward the at least one draw-off device (310, 320, 330, 340).

15. The apparatus as recited in claim 14, wherein the sheet material is transported in the same direction in the draw-off area by the upper and lower first partial paths (110, 120).

16. The apparatus as recited in claim 14, wherein the sheet material is transported in opposite directions in the draw-off area by the upper and lower first partial paths (110, 120).

17. The apparatus as recited in claim 14, wherein the first partial paths (110, 120) have the same length.

18. The apparatus as recited in claim 14, wherein the second transport path (200) has an upper and a lower second partial path (210, 220) for transporting the sheet material (10) drawn off by the draw-off device (310, 320) in the draw-off area of the corresponding partial path (110, 120) of the first transport path (100) into a common second transport path (200).

19. The apparatus as recited in claim 14, wherein both the upper and the lower first partial paths (110, 120), and the at least one draw-off device includes a right and a left draw-off device which draw off the sheet material from the draw-off area either to the left or right at right angles.

20. The apparatus as recited in claim 14, wherein both the upper and the lower first partial paths (110, 120), and the at least one draw-off device includes a right and a left draw-off device (310, 320, 330, 340) which draw off the sheet material from the draw-off area either to the left or right at right angles and the second transport path (200) has an upper right, an upper left, a lower right and a lower left second partial path (210, 220, 230, 240) for transporting the sheet material (10) drawn off by the right or left draw-off device (310, 320, 330, 340) in the draw-off area of the corresponding partial path (110, 120) of the first transport path (100) into a common second transport path (200).

21. The apparatus as recited in claim 14, wherein the second transport path (200) includes corresponding second partial paths (210, 220, 230, 240, 250, 260) each having a same length.

22. The apparatus as recited in claim 14, wherein the second transport path (200) includes second partial paths (210, 220, 230, 240), and the at least one draw-off device (310, 320, 330, 340) draws off the sheet material (10) directly by a transport device (211, 222, 232, 242) of the second partial paths (210, 220, 230, 240).

23. The apparatus as recited in claim 14, wherein a control unit is provided for controlling and coordinating the draw-off devices (310, 320, 330, 340) and a draw-off time in the particular draw-off devices (310, 320, 330, 340).

24. The apparatus as recited in claim 14, wherein a control unit is provided for controlling and coordinating the draw-off devices (310, 320, 330, 340) and the draw-off time in the particular draw-off devices (310, 320, 330, 340) and the control unit evaluates the position of the sheet material (10) in the first transport path (100) for coordinating the draw-off devices (310, 320, 330, 340) and a draw-off time in the particular draw-off devices (310, 320, 330, 340).

* * * * *